US008730005B2

(12) United States Patent
Asselle

(10) Patent No.: US 8,730,005 B2
(45) Date of Patent: May 20, 2014

(54) CONTROL SYSTEM FOR MANAGING ACCESS TO RESTRICTED AREAS

(75) Inventor: Giuseppe Asselle, Bra (IT)

(73) Assignee: Giuseppe Asselle, Bra (Cuneo) (IT)

( * ) Notice: Subject to any disclaimer, the term of this patent is extended or adjusted under 35 U.S.C. 154(b) by 246 days.

(21) Appl. No.: 13/202,277

(22) PCT Filed: Feb. 19, 2010

(86) PCT No.: PCT/IB2010/050750

§ 371 (c)(1), (2), (4) Date: Oct. 21, 2011

(87) PCT Pub. No.: WO2010/097745

PCT Pub. Date: Sep. 2, 2010

(65) Prior Publication Data

US 2012/0032777 A1 Feb. 9, 2012

(30) Foreign Application Priority Data

Feb. 25, 2009 (IT) .............................. TO2009A0136

(51) Int. Cl.
*G05B 19/00* (2006.01)

(52) U.S. Cl.
USPC .............. 340/5.7; 380/44; 713/168; 713/171; 713/185; 726/2; 726/4; 726/5; 726/17; 340/5.81; 340/5.82; 340/5.83; 340/5.84; 340/5.85

(58) Field of Classification Search
USPC ........ 340/5.7, 539.1, 539.11, 540, 5.81–5.86; 726/8, 2, 4, 5, 17; 713/185, 168, 171; 380/44
See application file for complete search history.

(56) References Cited

U.S. PATENT DOCUMENTS

| | | | | |
|---|---|---|---|---|
| 7,852,196 | B1 * | 12/2010 | Adams | 340/5.86 |
| 2004/0053654 | A1 * | 3/2004 | Kokumai et al. | 463/1 |
| 2007/0044143 | A1 | 2/2007 | Zhu et al. | |

FOREIGN PATENT DOCUMENTS

| | | |
|---|---|---|
| EP | 1 868 125 | 12/2007 |
| FR | 2 915 606 | 10/2008 |
| WO | WO 01/37169 | 5/2001 |
| WO | WO 2008/105991 | 9/2008 |
| WO | WO 2008/125937 | 10/2008 |

OTHER PUBLICATIONS

Lumbroso Sylvain, Service or event e.g. sports event, access controlling method, involves validating access in case of success of interrogation, and updating, in real time, interrogated database to indicate that access authorization is validated, Oct. 2010, FR2915606 A1 (English Translation).*
International Search Report for PCT/IB2010/050750, mailed Apr. 7, 2010.
Written Opinion of the International Searching Authority for PCT/IB2010/050750, mailed Apr. 7, 2010.

* cited by examiner

*Primary Examiner* — Brian Zimmerman
*Assistant Examiner* — Bhavin M Patel
(74) *Attorney, Agent, or Firm* — Nixon & Vanderhye P.C.

(57) ABSTRACT

The invention is directed to a control system for managing access of users to a plurality of restricted areas. The control system includes at least one manager module and one or more provider modules. The modules are configured in particular fashions.

13 Claims, 6 Drawing Sheets

10
60
50
20
65
40
30
72
70
72
70
72
70
75
75
75

10

| | A | B | C | D | E | F | G | H | I | J | K | L | M | N | O | P | Q | R | S | T | U | V | W | X | Y | Z | a | b | c | d | e | f | g |
|---|---|---|---|---|---|---|---|---|---|---|---|---|---|---|---|---|---|---|---|---|---|---|---|---|---|---|---|---|---|---|---|---|---|
| 1 | Q | n | I | A | r | f | C | K | b | n | S | x | D | l | L | x | A | E | c | N | h | I | e | K | B | r | F | d | E | g | I | y | d |
| 2 | d | M | r | d | A | L | e | j | E | L | u | Q | j | O | u | l | z | L | j | M | l | K | u | Z | u | O | K | R | r | K | M | C | u |
| 3 | U | H | O | C | H | b | V | y | F | n | T | b | F | y | R | D | b | B | C | x | P | n | Z | b | C | z | g | y | W | F | b | K | y |
| 4 | k | W | k | K | x | S | r | k | Z | B | J | m | H | u | m | V | J | L | c | c | G | K | N | N | T | c | G | P | O | m | S | u | S |
| 5 | Q | x | h | Q | A | h | C | T | b | V | i | Q | O | U | B | i | P | n | O | u | x | i | u | n | u | I | i | d | x | O | y | f | n |
| 6 | M | I | R | c | z | R | s | j | Y | u | d | I | f | F | z | n | A | W | C | n | Q | f | U | Y | x | U | y | Q | A | s | I | M | C |
| 7 | d | n | r | T | x | e | y | r | E | X | r | w | S | y | d | Z | R | f | w | N | G | z | N | b | Z | h | L | f | W | r | P | d | V |
| 8 | X | I | U | E | P | z | I | P | I | K | O | h | u | O | H | y | X | H | M | b | h | M | t | L | u | U | w | t | v | E | b | F | S |
| 9 | D | R | b | K | x | f | s | k | b | u | j | V | H | l | j | V | f | t | X | p | X | T | Y | n | V | f | Z | X | c | w | T | y | n |
| 10 | W | H | X | c | A | H | E | N | a | L | P | j | c | W | B | H | P | E | B | Z | N | h | M | E | M | p | h | N | A | O | i | M | C |
| 11 | k | p | i | i | X | i | y | s | g | B | d | Z | D | L | e | Y | c | p | g | d | E | e | U | q | c | Y | d | T | o | e | N | Z | W |
| 12 | N | b | Y | N | p | P | b | Y | F | p | c | M | p | F | u | n | M | t | M | F | S | S | p | X | t | F | Y | t | M | y | Z | k | n |
| 13 | D | R | v | Q | r | v | J | r | e | K | j | l | Z | j | K | Z | W | h | w | v | l | E | Y | h | C | Z | h | Q | j | M | Z | C | d |
| 14 | G | l | O | d | B | V | z | Q | R | G | O | m | V | A | a | J | S | A | V | I | a | q | W | q | B | a | L | w | O | a | y | q | Q |
| 15 | m | B | H | X | f | V | e | s | h | W | e | V | u | R | V | o | h | W | g | O | A | R | t | E | y | X | y | Y | v | p | E | Z | p |
| 16 | G | n | i | z | P | A | N | r | Z | p | O | I | c | p | j | O | c | p | v | j | G | h | N | q | I | h | L | j | Q | F | Q | y | Z |
| 17 | k | x | Q | o | l | S | l | p | I | m | J | k | Z | H | Y | D | X | V | e | Z | y | H | x | Z | k | Y | x | R | c | y | g | N | l |
| 18 | D | A | b | C | X | m | C | X | b | X | i | R | C | m | v | p | S | m | C | b | Y | J | t | E | R | f | Q | E | p | T | D | P | Q |
| 19 | q | t | G | U | F | Y | y | s | R | G | f | w | f | y | a | H | v | L | R | v | v | f | L | k | K | M | d | Z | H | f | R | f | t |
| 20 | l | J | o | A | f | s | O | U | h | O | A | l | J | A | X | e | Z | j | X | n | J | H | e | G | c | X | n | q | Q | W | d | K | Y |
| 21 | p | q | z | d | F | H | a | m | X | m | e | M | o | p | K | o | j | V | A | O | c | R | Z | t | B | X | F | R | c | M | y | F | c |
| 22 | T | k | I | Q | G | i | N | S | r | O | F | l | I | l | t | h | M | H | i | I | h | w | K | T | K | j | A | a | w | n | E | Q | w |
| 23 | D | b | h | v | l | t | z | s | b | W | t | T | k | R | V | m | W | n | O | C | S | U | h | m | k | U | L | H | X | V | L | h | Z |
| 24 | F | I | K | E | m | S | D | p | F | y | G | d | Y | y | a | J | v | a | R | n | y | a | I | N | I | G | i | R | h | r | y | n | n |
| 25 | a | v | q | a | P | u | e | U | g | o | i | R | o | r | i | p | u | Y | B | G | q | W | x | q | c | f | B | q | X | D | Q | W | R |
| 26 | J | M | i | Q | q | t | L | u | D | O | f | D | U | z | W | L | S | O | p | g | B | j | z | R | r | D | q | L | o | b | h | K | b |
| 27 | m | k | K | l | J | i | z | o | r | K | z | r | k | J | f | r | f | m | A | Y | v | o | O | m | G | D | X | E | O | A | S | o | S |
| 28 | F | R | t | F | q | L | O | P | e | l | e | M | f | T | N | z | M | W | c | J | N | a | g | P | T | a | i | g | h | T | L | d | t |
| 29 | H | n | I | a | I | n | a | u | q | s | G | r | N | a | t | o | n | X | D | r | t | M | N | z | n | M | B | I | P | r | B | n | I |
| 30 | a | M | g | v | x | U | R | m | L | x | M | m | o | E | N | L | j | k | w | C | B | k | e | B | N | j | m | C | j | E | Z | W | w |
| 31 | L | t | B | O | L | b | B | W | p | b | q | x | T | J | d | u | I | q | W | e | t | j | I | k | r | G | U | q | z | I | p | J | b |
| 32 | H | e | s | l | m | z | u | h | x | s | F | E | h | z | i | w | c | I | p | T | L | p | x | R | p | d | H | T | e | f | Z | k | B |
| 33 | O | A | x | A | P | v | e | A | T | D | j | c | R | A | F | r | z | N | e | t | v | E | c | t | D | F | v | g | P | N | t | i | o |
| 34 | a | q | Q | a | w | g | C | w | p | u | f | H | f | d | o | Q | I | g | M | a | J | n | f | H | z | f | i | Y | H | a | W | D | z |
| 35 | E | R | i | v | N | S | r | Q | g | v | M | w | r | E | T | u | f | V | C | G | m | X | F | m | u | t | Q | A | g | E | m | b | u |
| 36 | o | k | E | w | w | i | B | i | c | C | f | K | N | a | g | C | O | K | i | t | L | B | g | k | p | Y | k | H | Z | p | L | k | M |

*Fig. 2*

CONTROL SYSTEM FOR MANAGING ACCESS TO RESTRICTED AREAS

This application is a National Phase Application of International Application No. PCT/IB2010/050750, filed on 19 Feb. 2010, which designated the U.S., and claims priority to IT Application No. TO2009A000136, filed on 25 Feb. 2009, the entire content of each of which is hereby incorporated by reference.

FIELD OF THE INVENTION

The present description relates to techniques for managing access and more in particular to a control system for managing access to restricted areas.

DESCRIPTION OF THE RELEVANT ART

The presence of a control system for managing access is required in those situations in which it is intended to grant to some users, on the basis of certain rules, for example after payment of a fee, permission to gain access to one or more restricted areas or structures.

Some possible applications are indicated hereinafter only by way of non-limiting example:

- access to entertainment structures (cinemas, museums, amusement parks) in a tourist resort;
- access to skilifts in a ski resort;
- access to sports facilities (swimming pools, gymnasia, saunas);
- access to rooms of a hotel; and
- access to virtual environments (restricted web areas).

Known to the art are various solutions that enable management of access to restricted and shared areas.

A first example is represented by the typical ticket-office at which a customer purchases an entry ticket, which is checked and "validated" in such a way that it cannot be reused, for example by tearing a part thereof or impressing a date thereon, upon entry to the entertainment structure selected.

A different solution is represented by the purchase of a subscription that entitles the person to access various entertainment structures (for example, a subscription to museums of a town). In this case, the customer purchases a block of tickets and then subsequently decides where to use these tickets within a range of entertainment structures available. In this case, the customer pays the subscription and the amount is distributed evenly between all the structures that the subscription covers, but in this way the structures that are visited frequently are penalized.

OBJECT AND SUMMARY OF THE INVENTION

The object of the present invention is to provide a control system for managing access to restricted areas that will be simple to implement, inexpensive, and at the same time will guarantee the possibility of having a unique recognition of the individual access to each entertainment structure that forms part of the district managed by the control system.

The control system according to the present invention guarantees at the time same a high level of security, efficiency, functionality, and versatility.

With a view to achieving the above purpose, the subject of the invention is a control system for managing access to restricted areas, which has the characteristics specified in claim 1, as well as a corresponding method.

The claims form an integral part of the teaching regarding the invention provided herein.

BRIEF DESCRIPTION OF THE ANNEXED DRAWINGS

The invention will be now described, purely by way of non-limiting example, with reference to the annexed drawings, wherein:

FIG. 2 shows a portion of a matrix of the symbols;

DETAILED DESCRIPTION OF EMBODIMENTS

The access-control system according to the invention enables management of access to restricted areas by distributing passes and checking the validity of said passes upon entrance to the restricted area.

The control system is moreover configured for generating different types of rights to access that can have a variable validity in time (single access, access for a limited period of time, access for an indeterminate length of time).

The ensuing description regards the case of access to a physical area, but it can also be applied to virtual environments.

Figure 1:
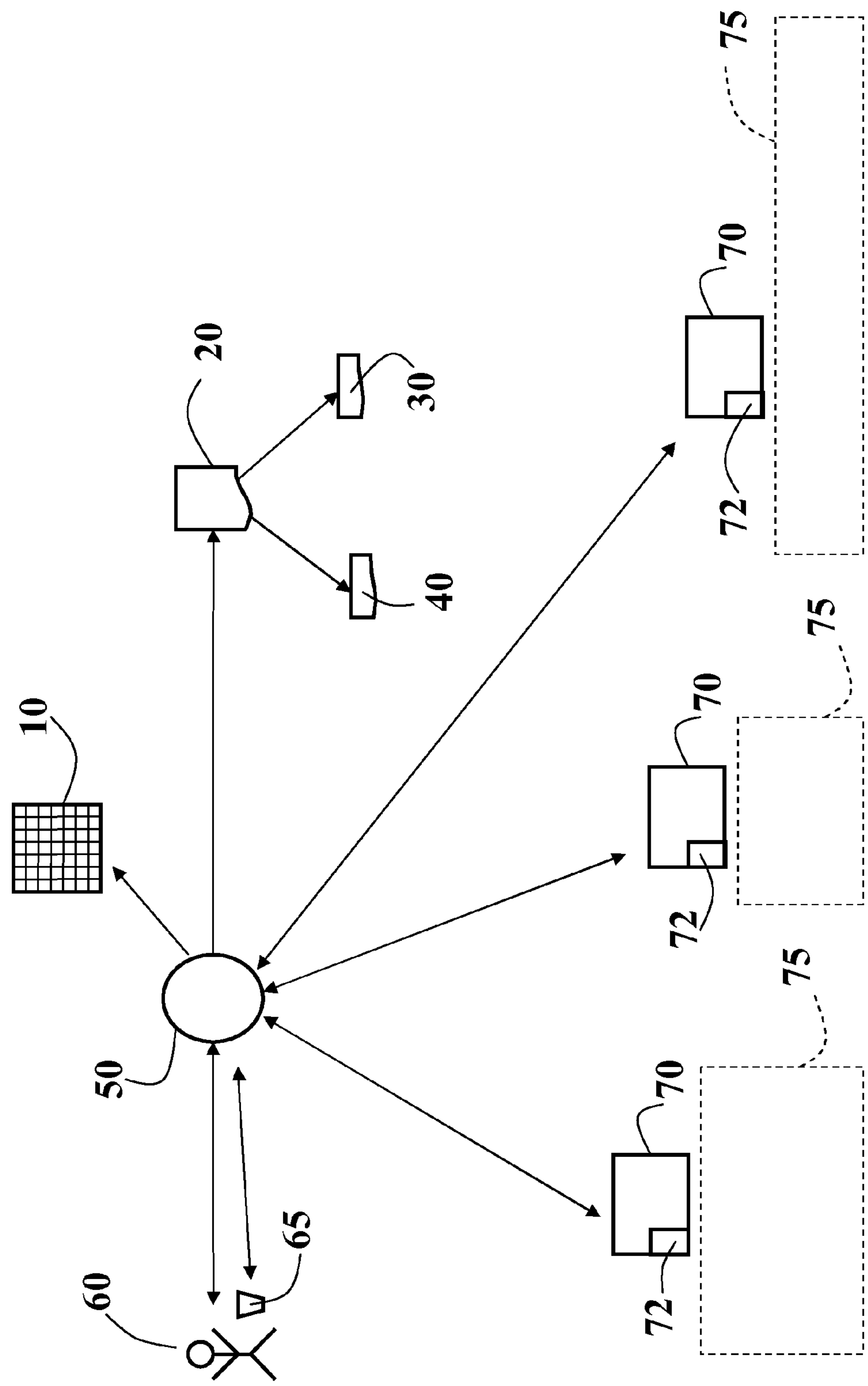
FIG. 1 shows an example of scenario of application of the control system according to the present invention.
Figure 3:
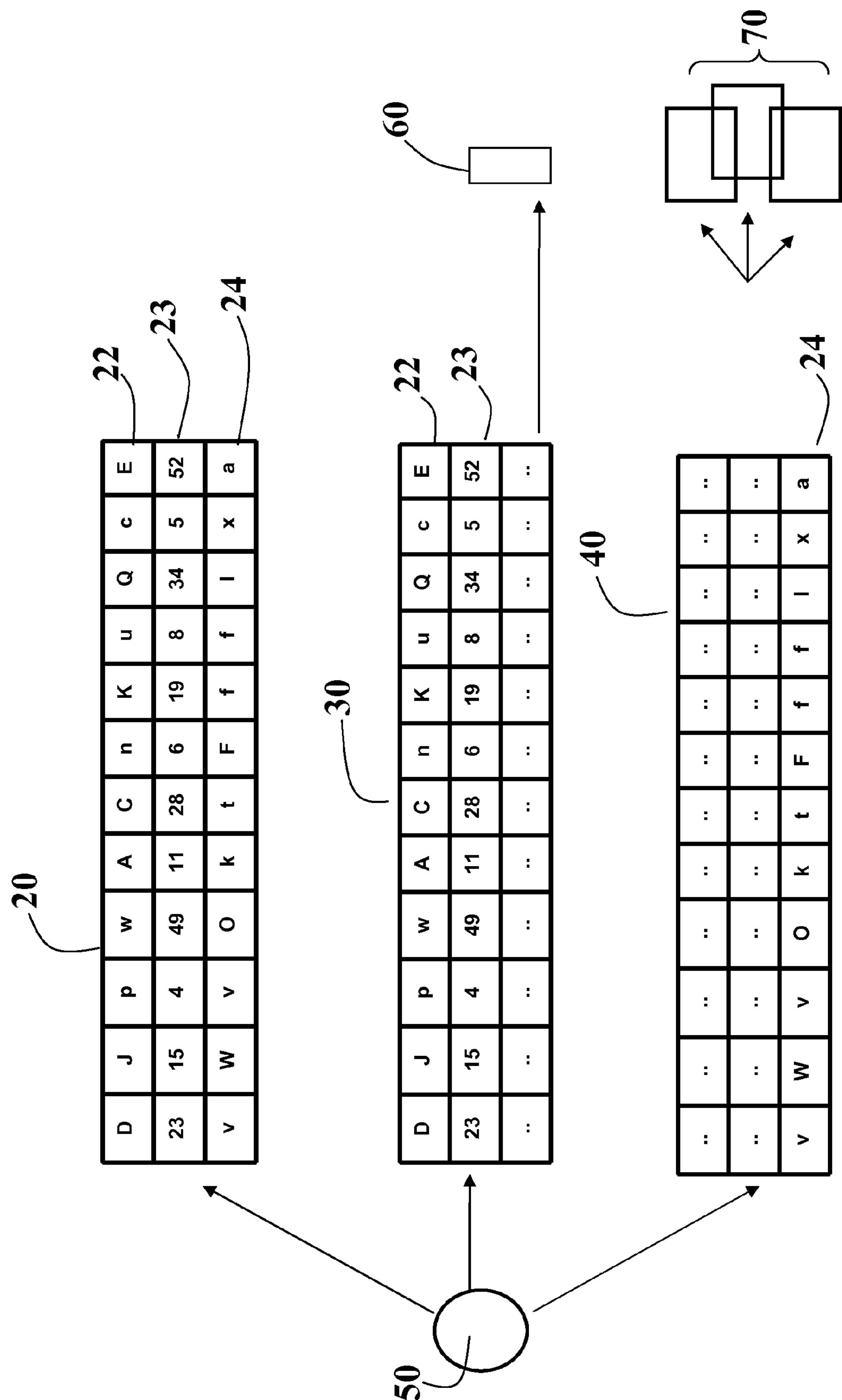
FIG. 3 shows an example of security codes.

For a better understanding of the ensuing description, preliminarily provided are some definitions of modules or entities that form part of the access-control system and that are illustrated in FIGS. 1, 2, and 3.

A manager module comprises, for example, a central processing unit 50 that issues and checks rights to access 20.

A user 60 is, for example, a subject who uses restricted areas 75 to whom the manager 50 assigns a right to access 20.

A provider module comprises, for example, a local processing unit 70 set at entrance to a restricted area 75; the provider module is configured for carrying out a check on the right to access 20 for authorizing access to the user 60, and for receiving and transmitting information to the manager 50.

Upon arrival of a new user 60, the manager module first of all assigns an identifier code, or user code, which enables unique identification of the user 60.

When the user 60 requests a permission to enter a restricted area 75, the central processing unit 50, after checking the possibility of granting the permission, generates a transaction. Assigned to the transaction is an identifier that distinguishes it in a unique way from the other transactions and that will link it to the user 60.

The control system comprises a series of files, in which the information regarding the users 60, the provider module 70, and the transactions is stored.

The control system according to the invention comprises the manager module 50 configured for issuing and checking the rights to access 20 associated to the transactions, and one or more provider modules 70, in which each provider module 70 is set at the entrance to a restricted area 75 and is configured for carrying out a check on the right to access 20. The control system is configured for managing access of the users

60 to a plurality of restricted areas 75 via the use of the rights to access 20 issued by the manager module 50.

In addition, the manager module 50 is configured for carrying out a step of enabling of the right to access 20 associated to the transaction, transmitting information on the transaction to the provider module 70.

Each provider module 70 is configured for verifying the validity of the right to access presented by the user 60, and authorizing, on the basis of the outcome of the verification, access to the corresponding restricted area 75. In addition, each provider module 70 is configured for notifying to the manager 50, at an instant in time that can be selected, that access of the user 60 to the corresponding restricted area 75 has been granted.

Finally, the manager 50, after reception of the specific notification sent by the specific provider module 70, carries out a subsequent step of closing of the transaction. By "specific notification" is meant a communication within which there are elements that enable unique identification of the provider module 70, which generates and transmits the notification. In this way, a unique recognition of the individual access to the individual restricted area 75 is obtained, and the manager 50 is able to take account of the access assigning to the provider module 70 identified by the specific notification the amount associated to the transaction.

In further detail, following upon creation of a transaction, the manager 50 generates a matrix of the symbols 10 that will serve for generation of a right to access 20 and sends, in the enabling step, the matrix of the symbols 10 with the corresponding identifier code of the transaction to all the provider modules 70. The matrix 10 is moreover stored in a file present in the manager 50. Each transaction is paired to a different matrix of the symbols 10, and each matrix is different from the other matrices.

A right to access 20 is a code or a logic key, which enables the user 60 to be recognized in a unique and secure way by the provider module 70 and enter the restricted area 75. The right to access 20 is generated by the manager 50, and a first part thereof, designated by the reference number 30, together with the transaction identifier, are stored in a device 65 (a reconfigurable magnetic card, an RFID tag, a badge, or an entrance ticket), which is then handed over to the user 60.

In order to increase the security of the transactions, the rights to access 20 are transmitted in an asymmetrical way (i.e., different and complementary information is transmitted) to the user and to the provider modules 70. In particular, transmitted to the user 60 is the first portion 30, whilst transmitted to the provider modules 70 is the second portion 40 of the right to access 20, together with the entire matrix of the symbols 10.

Transmission to the provider modules 70 of the information on the transaction gives to the provider modules 70 themselves the possibility of carrying out in an autonomous and independent way a check of the key 30 presented by the user 60 even in the absence of the on-line connection with the manager 50. In this way, the provider module 70 authorizes access of the user 60 and simultaneously or in a subsequent moment notifies to the manager 50 access to the corresponding restricted area 75.

On each access set at entrance to a restricted area 75 there is hence present a provider module 70, which, by means of a reader 72, checks the validity of the portion 30 of the right to access 20 supplied by the user 60.

Assigned to each transaction are different codes, i.e., each transaction can be uniquely distinguished from the others because it has a different matrix of the symbols 10 and a different right to access 20, which are purposely generated appropriately for that particular transaction.

This variability enables accessibility through checks based upon codes that change each time from one user to the next, thus achieving a high flexibility. This moreover guarantees a greater security as compared to the systems that carry out checks based upon permanent codes set in the provider module present at the access point.

Each user 60 can use as identifier a device 65 of his own (identification tag, RFID device, badge, USB key, palmtop, bluetooth cellphone), on which the manager 50 loads the transaction identifier and the information contained in the first portion 30 of the right to access 20. This information is necessary for recognition of the user 60 and of the transaction. Alternatively, the manager 50 can supply to the user 60 a device 65 on which it has previously loaded the same information. In the latter case, upon exit from the restricted area, the user 60 returns the device 65 to the manager 50, which can reconfigure it and reuse it for other users.

The single user 60 is allowed to request one or more rights to access 20 to be used, according to his own free choice, in the areas or structures controlled by the access-control system.

In greater detail, the right to access 20 is a code that is generated by choosing in an arbitrary way a certain number of elements or cells starting from the matrix of the symbols 10 combined to that particular transaction. In addition, the right to access 20 is a code made up of three fields, designated by the reference numbers 22, 23 and 24. The fields 22, 23 and 24 contain, respectively, the column co-ordinates, the row co-ordinates, and the contents of the cells selected starting from the matrix of the symbols 10.

The manager 50 generates also a pair of keys 30, dividing the information present in the right to access 20, and hands the keys over to the user 60 and to the provider modules 70.

In particular supplied to the user 60 is the first key 30 (also referred to as "unblocking code"), which comprises the fields 22 and 23 that contain the co-ordinates of the cells of the matrix of the symbols 10 that make up the right to access 20. Instead, supplied to the provider modules 70 is the second key 40 (referred to as "random code"), which comprises the field 24, stored in which are the contents of the corresponding cells that make up the right to access 20.

The set of keys used by the access-control system is hence divided into two parts. One part is assigned to the provider modules 70 and is constituted by the matrix of the symbols 10 and by the second key 40 (random code), and the other part is assigned to the user 60 and is constituted by the first key 30 (unblocking code). Of course, it is possible to reverse the pairings between the subjects and the keys, and in particular it is possible to decide to assign the key 40 to the user and the key 30 (once again together with the matrix of the symbols 10) to the provider modules 70. Hence, both the user 60 and the provider modules 70 are not in possession of the complete right to access 20, but have only a respective portion thereof. In this way, the security increases considerably in so far as to obtain access there must be a correct recombination of the information.

Each provider module 70 has available the second key 40 to be paired with the first key 30 presented by a user 60 and has moreover available the matrix of the symbols 10. In particular, starting from the first key (unblocking code) supplied by the user 60, which contains the co-ordinates of the cells, the specific provider module 70 reads the contents of the cells of the matrix of the symbols 10 addressed by the co-ordinates and compares said contents with the second key 40 (random code) at its disposal.

The provider module 70 is hence able to check in an autonomous and independent way the authenticity of the reconstructed right to access, without the need to have an interaction with the central processing unit of the manager 50.

If the comparison yields a positive result, the provider module authorizes entry of the user 60 into the restricted area 75. At a subsequent moment, or simultaneously to entry of the user 60, the provider module 70 is in the condition of being able to notify to the manager 50 that the transaction has gone through.

The manager 50 receives from the provider module 70, together with the specific notification of the transaction having been made, also the pair of logic keys 30 and 40 and can hence check the authenticity of the reconstructed right to access. If also this second check yields a positive result, the manager 50 records the access of the user 60 and activates the consequent actions (for instance, accrediting of the amount of the right to access, accounting, statistical monitoring, transfer of funds), amongst which also closing of the transaction.

In the complex structure considered, principally two requirements are identified. On the one hand, there is the need to manage in a common way assignment of the rights to access 20; on the other, it is necessary to ascertain in which restricted area 75 the individual right to access 20 has been used by the user 60.

Each provider module 70 is interested in seeing that the access made by the user 60 is recognized, whereas the manager 50 is interested in monitoring whether the access notified by each individual provider module 70 corresponds to an authentic right to access 20.

Finally, the user 60 is interested in having available a right to access 20 that will enable him to access the restricted area 75 to which he wishes to gain access.

In order to be able to satisfy all these interests the control system, basing itself upon the crossed generation of codes, generates a set of logic keys 20, and 40 thanks to which:

- the user 60 can access the restricted area 75 only if he supplies a valid logic key 30;
- the provider module 70 can check the authenticity of the key 30 of the user 60 by pairing it with the logic key 40 and ascertaining that in the matrix of the symbols 10 the contents of the cells are identical to the contents of the corresponding cells that form the reconstructed right to access by pairing the key 30 with the key 40; and
- the provider module 70 cannot notify to the manager 50 an access without supplying the exact pairing of the two keys, its own key 40 and the key 30 of the user.

The manager 50 comprises a processing unit provided with software and firmware dedicated to:

- generation of the matrix of the symbols 10;
- generation of the set of keys 20, 30, 40;
- pairing of the keys 30, 40 with the identifiers of the individual right to access 20 (updating of the files);
- communication with the user 60 and with the provider modules 70;
- control of the specific notifications of access sent by the provider modules 70; and
- activation of related procedures for keeping account of the access.

Each provider module 70 comprises a processing unit that is able to:

- communicate with the manager 50 and with the user 60 or with the device 65;
- store the matrix of the symbols 10;
- store the keys 30, 40; and
- check the authenticity of a key 30, pairing it with the key 40 and comparing the result of the pairing with the matrix 10.

The user 60 is equipped with the physic/logical medium 65 capable of receiving the logic key 30 from the central processing unit 50 and transmitting it to the specific provider module 70.

In the case where the key 30 that is to go to the user 60 is transmitted in the form of wireless message (sms, bluetooth) on a mobile apparatus (cellphone or palmtop), the provider modules 70 will be equipped with a communication interface compatible with said mobile apparatus. Instead, if the key 30 is supplied to the user 60 in the form of RFID tag, associated to the provider module 70 are transceivers provided with an antenna. There moreover exist other possible variants that envisage supply to the user 60 of the key 30 on a paper medium as code in clear (of a PIN type) or barcode; in this case, the provider modules 70 will be equipped with keypads accessible to the user 60 or with barcode readers.

On the basis of the level of inviolability that it is intended to guarantee to the system the manager 50 chooses:

- the size of the matrix of the symbols 10, accordingly varying the number of symbols present in the matrix itself; and
- the complexity of the set of keys 20, 30, and 40 by acting on the size of the codes used.

In fact, as the size of the matrix of the symbols 10 and/or the amplitude of the right to access 20 (and consequently of the first key 30 and of the second key 40) increases, the likelihood of success of an attempt at violation of the system decreases.

Described in what follows, with reference to FIGS. 2 and 3, is an embodiment chosen from among the possible settings and the possible levels of security that can be adopted. It is emphasized that the matrix can be constructed with any type of character, number, or symbol.

FIG. 2 shows a portion of the matrix of the symbols 10, which is too extensive to be illustrated completely in a single figure.

The matrix 10 of the symbols, described here purely by way of illustration, has the following characteristics:

- it is a square matrix (number of the columns equal to the number of the rows, and equal to 52);
- the content of each cell is a letter of the alphabet (distinguishing between lower-case and upper-case characters); and
- the total number of the cells is given by the number of the columns multiplied by the number of the rows (i.e., 52*52=2704).

The columns are indicized in the following way: the first column is identified by the upper-case letter "A"; the next columns are indicized each with the upper-case letters of the alphabet up to "Z" (26-th column); then, the index of the 27-th column is the lower-case letter "a", and the other columns are indicized each by the next lower-case letters of the alphabet up to "z" (52-th column).

The rows are instead indicized with a numeric index that ranges from 1 to 52.

The steps followed for creation of the matrix of the symbols 10 are now indicated:

- each of the 52 letters (upper-case and lower-case) that represent the index of the columns is randomly assigned to 52 cells spread about in the table; and
- said assignment is repeated for each of the remaining letters (assigned to each letter are hence 52 cells of the matrix) progressively exhausting all the cells of the matrix.

FIG. 3 shows an example of generation of the keys 30 and 40 starting from a right to access 20 generated starting from the matrix of FIG. 2.

The manager 50, after creating the matrix of the symbols 10 (see FIG. 2), randomly selects a plurality of cells; namely, in the example of FIG. 2, it selects twelve cells that form the right to access 20.

The manager 50 generates the first key 30, also referred to as unblocking code, and assigns it to the user 60. The unblocking code is constituted by the fields 22 and 23 of the right to access 20 and contains the co-ordinates of the cells selected.

The manager 50 also generates the second key 40, also referred to as random code, which comprises the field 24 of the right to access 20 and contains the contents of the cells selected. The manager 50 assigns the key 40 to the provider modules 70, together with the matrix of the symbols 10.

The likelihood of outsiders managing to guess the code associated to the right to access 20 depends upon the size of the matrix of the symbols 10 and upon the number of cells that make up the right to access 20 (and consequently also the random code 40 and the unblocking code 30).

In the case illustrated in FIG. 3 twelve cells have been arbitrarily chosen within the matrix 10 of FIG. 2. The twelve cells come to form the access code or right to access 20. The number of access codes 20 that can be obtained by choosing twelve cells in a random way is given by the combinations of twelve cells starting from the number of elements of the matrix, which in this case is 2704.

Such a high number of possible combinations renders substantially impossible to guess the right to access 20 even knowing the matrix of the symbols 10 or one of the two keys 30 or 40.

Consider now the case where an attempt at guessing one of the codes is made by one of the subjects that utilizes the access system.

In order to create a mutual protection a minimum threshold of cells is set (for example, seven out of twelve) that must correspond to those of the original code in order for the reconstructed right to access to be deemed valid by the manager 50. This serves to create a balanced level of difficulty between the user and the provider module in the possibility of violation of the system.

In fact, the utilizers of the access system are the user 60 and the provider modules 70, which, in order to conclude a transaction, each guaranteeing for itself the performance of the obligation of the other, undertake to exchange the codes upon request, by the user 60, to pass through the entrance point of the specific provider module 70. The service rendered by the specific provider module 70 (consent to entrance of the user 60 in its own restricted area 75) occurs only after the user 60 communicates to the provider module 70 the first key 30 or unblocking code; it is only by so doing that the provider module 70 in question can check, using the matrix of the symbols 10 and the key which it has available, the authenticity of the unblocking code 30 and have the guarantee that the performance of the obligation by the user 60 is acknowledged to it by the manager 50 (i.e., payment of the amount due, registration of access, accounting, statistical monitoring).

We shall now consider the case where a provider module 70 attempts to guess the unblocking code 30 (assigned to the user 60 by the manager 50) in order to put together the right to access 20 and thus obtain performance of an obligation in its favour, without however having received any request for access from the user 60.

In this case, the provider module 70 has available the matrix of the symbols 10 and knows, thanks to the random code 40, the contents of the twelve cells of the right to access 20 but does not know the co-ordinates thereof within the matrix of the symbols 10. The possible combinations of the co-ordinates of the twelve cells correspond to the combinations of twelve elements starting from 52 symbols (in fact, each element of the matrix 10 is repeated, in this example illustrated, exactly 52 times).

In the case where, for example, of the twelve cells it is sufficient to guess seven, in this case the possible combinations correspond to $$52*52*52*52*52*52*52=1\ 028\ 071\ 702\ 528$$

Also in this case, such a high number of possible combinations makes it substantially impossible for the provider module 70 to guess the right to access 20, even in the presence of a minimum threshold of seven elements out of twelve that have to correspond.

We shall now consider the case where the user 60 wishes to try to vary his own unblocking code 30 without the provider module 70 realizing it, in order that, with the unblocking code 30 varied, the provider module 70 will not be able to obtain from the manager 50 performance of the obligation in its favour. Hence, in this case, the user 60 will seek to communicate to the provider module 70, at the moment of the request for access, an erroneous code, but one that will, however, pass the check that the provider module 70 makes by comparing the unblocking code 30 supplied by the user 60 with the random code 40 and the matrix of the symbols 10 at its disposal.

To manage to do this, the user 60 must supply to the provider module 70 a counterfeited unblocking code that, with one or more co-ordinates different from those of the authentic unblocking code 30, bears in any case the co-ordinates of cells of the matrix 10 of the symbols that have the same contents as the cells indicized by the authentic unblocking code 30.

If it were not so, the provider module 70 would realize that the counterfeited unblocking code is not authentic and would not authorize access for the user 60.

The probability of the user 60 managing to replace one co-ordinate of the unblocking code 30 with another co-ordinate that contains the same letter is equal to 51/2703. In fact, within the matrix of the symbols 10, there are another 51 cells with the same contents as those of a certain co-ordinate; altogether the matrix of the symbols 10 contains 2704 cells; excluding the one considered, there remain 2703. There are thus approximately two chances out of one hundred of the user 60 managing to modify the unblocking code 30 without being discovered by the provider module 70.

As compared to the previous situations there is hence a concrete possibility of violation, but this only in the case where it is envisaged that the manager considers the reconstructed right to access authentic if this is supplied by the provider module 70 correctly for all of the twelve cells that make it up.

If, as in the previous cases, the right to access 20 is deemed authentic even with only seven cells right out of a total of twelve, in order to prevent in regard to the provider module 70 authentication of the right to access 20, the user must therefor be able to counterfeit successfully at least six co-ordinates.

To render the right to access null, the user must manage to vary six cells, and in this case the provider module will notify less than seven cells correct to the manager.

In this case, the probability of the user 60 managing, without being discovered, to counterfeit six cells of the unblocking code 30 corresponds to:

(51/2703)*(51/2703)*(51/2703)*(51/2703)*(51/2703)*(51/2703)=0.00000000004 i.e., approximately four chances out of 100 000 000 000.

In conclusion, in order to render violation and/or counterfeiting of the codes on which the control system is based substantially impossible, one of the most effective approaches is not only to adopt a matrix of the symbols 10 that is sufficiently extensive, but also to envisage a right to access 20 with a total number of cells higher than the number of cells thereof required for authentication. It is only in this way that it becomes substantially impossible both for the user 60 and for the provider module 70 to violate the system.

The interaction of the manager 50 with the provider modules 70 is now described.

First step: enabling, i.e., assignment of the rights to access 20. The provider modules 70 are in contact with the manager 50, from which they progressively receive, or from which they can request directly, the data regarding the rights to access 20 assigned to the users 60. The data that each provider module 70 can know are the identifier of the single transaction, the identifier of the single right to access 20, the corresponding matrix of the symbols 10, and the corresponding second key or random code 40.

Second step: request for access. When the user 60 reaches a specific provider module 70, he renders himself recognizable by communicating the first key or unblocking code 30 (generated and transmitted to him by the manager 50). When the authenticity of the unblocking code 30 has been verified, thanks to the pairing with the second key or random code 40 and to the comparison with the matrix of the symbols 10, the provider module 70 authorizes entry of the user 60 into its own restricted area 75.

Third step: notification of access. Once access to the user 60 has been authorized, the specific provider module 70 notifies the manager 50 of the reconstructed right to access (pairing of the unblocking code 30 and of the random code 40).

Fourth step: closing of transaction. Once the reconstructed right to access has been received and verified, the manager 50 registers that access has been granted and carries out the actions envisaged (accrediting of the amount due for the right to access, accounting, statistical monitoring, transfer of funds, etc.).

The interaction of the user 60 with the specific provider module 70 envisages a step of identification of the user. Once the user 60 has reached the provider module 70, ha gains access to the restricted area 75 of the structure rendering himself recognizable at the entrance to the area itself. Recognition occurs by communicating to the reader of the rights 72 of the specific provider module 70 the unblocking code 30, which identifies the user 60 in a unique way and identifies in a unique way also the specific right to access 20. The provider module 70, after having identified the user 60, authorizes access to the corresponding area 75.

Figure 4:
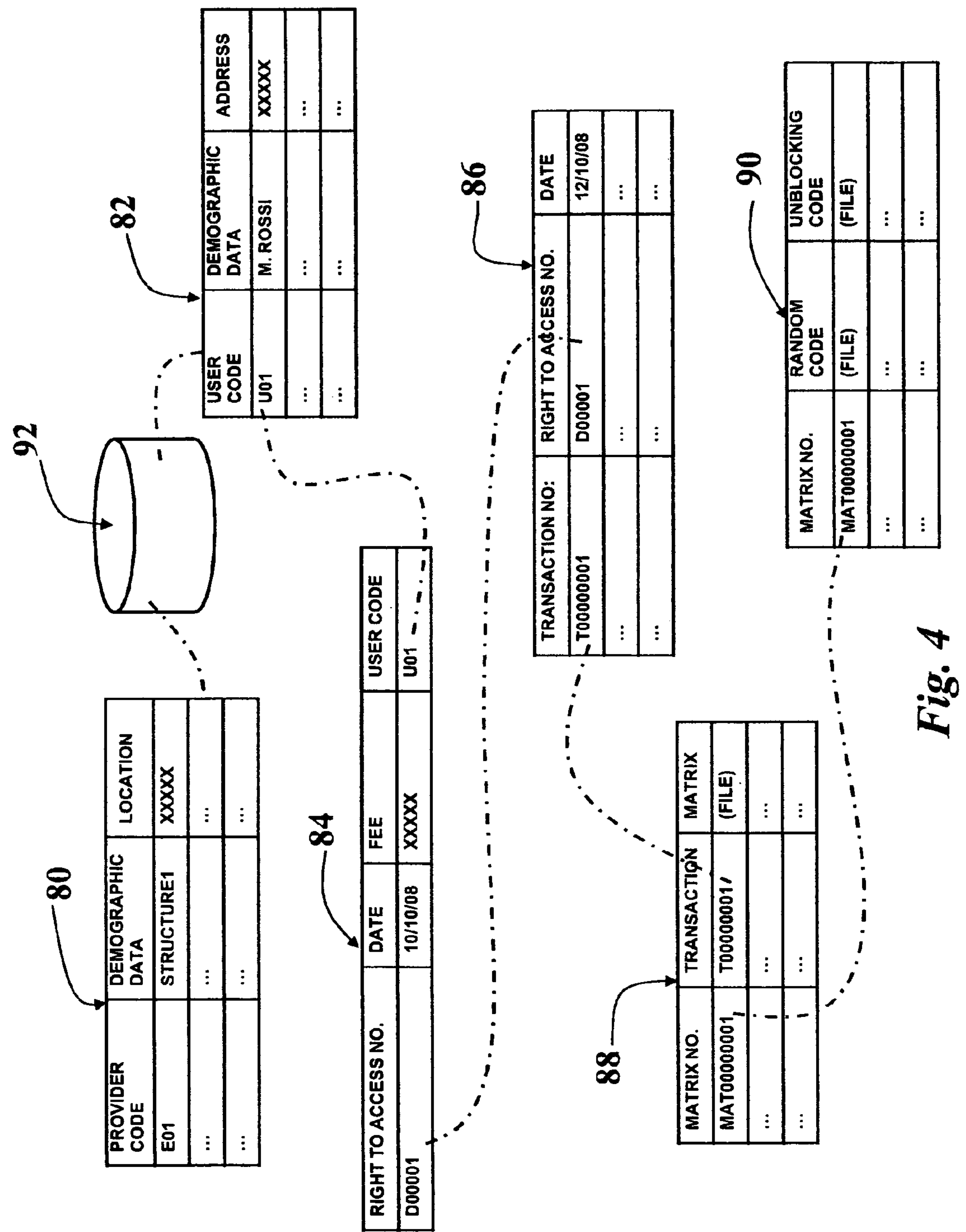
FIG. 4 shows the relations between the files of the control system.

With reference to FIG. 4, the files present in the control system are now described.

The general file 92 has, stored inside it, the identifier codes of the utilizers of the system, i.e., of the users 60 and of the provider modules 70.

There then exists a file 80 of the codes of the provider modules, in which for each provider module 70 stored in a record is the relevant information (supply code, demographic-data field, and location field).

Upon arrival of a user 60, a new record is created in the file 82 of the user codes. Stored in the record is the information on the user code, the demographic-data field, and the address field.

The file 84 of the rights to access comprises records formed by a right-to-access-No. field, a date field, a fee field and a user-code field. The field "user" enables the file 84 of the rights to access and of the file 82 of the user codes to be set in relation.

For each transaction a new record is added to the file 86 of the identifiers of the transactions. Each record comprises a transaction-No. field, a right-to-access-No. field, and a date field. Also in this case, the field "right-to-access No." sets the file 84 in relation with the file 86.

The file 88 of the matrices of the symbols envisages a record for each new matrix generated. The record contains a matrix-No. field, a transaction-No. field, and a field that contains the matrix proper. The field "transaction No." sets the file 88 of the matrix of the symbols with in relation the file 86 of the identifiers of the transactions.

Finally, the file 90 of the access codes contains a record for each right to access issued by the manager 50. In this case, there is a matrix-No. field, a random-code field, and an unblocking-code field.

Figure 5:
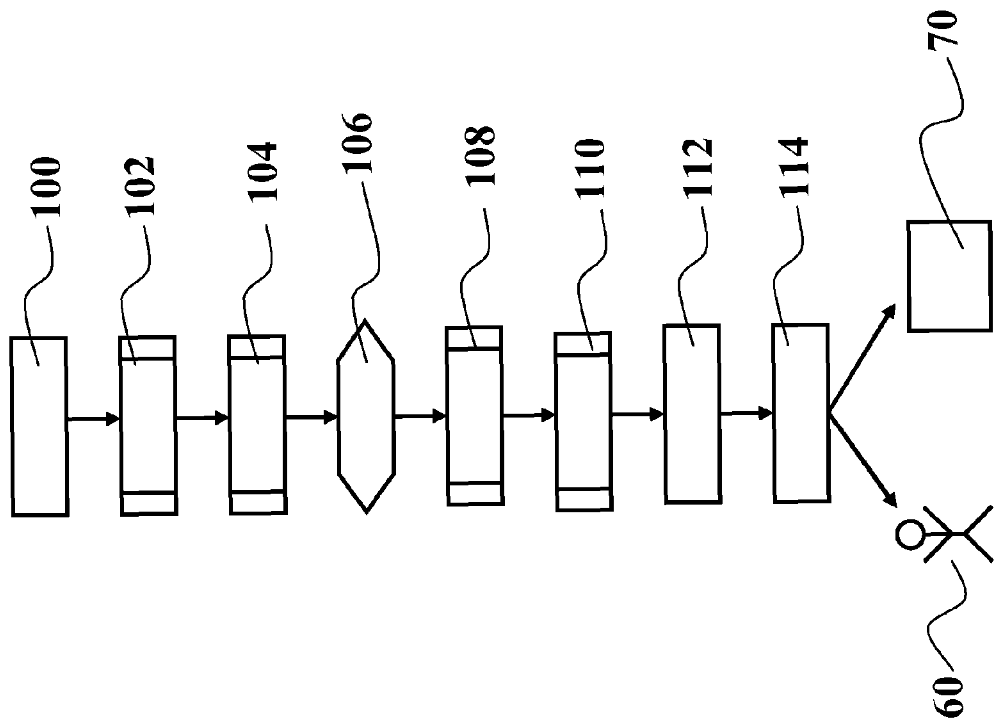
FIG. 5 is a flowchart of the steps for preparation of a right to access.

With reference to FIG. 5, a flowchart of the steps for the preparation of the right to access 20 is now described.

In a step 100, the manager 50 processes an order for assignment of a right to access 20. In the next step 102, identification of the user is carried out, and in the step 104 the assignment of an identifier to the right to access is made. For example, an identifier of the right to access may contain the following information: user code, date, progressive number.

In a step 106, there then occurs preparation of the codes of the control system, and in the step 108 there occurs assignment of an identifier to a transaction. For example, an identifier of a transaction may contain the user code and the progressive number.

In step 110, there are generated the matrix of the symbols 10 and of the corresponding rights to access 20, unblocking code 30, and random code 40.

Next, in step 112 combination is made between:

right-to-access identifier (first field of the file 84);
transaction identifier (first field of the file 86);
matrix of the symbols 10;
right to access 20;
unblocking code 30; and
random code 40.

Finally, in a step 114, the identifiers and codes are transmitted to the provider module 70 and to the user 60. In particular, the provider module 70 receives:

the right-to-access identifier;
the transaction identifier;
the matrix of the symbols 10; and
the random code 40.

The user instead receives:

the right-to-access identifier;
the transaction identifier; and
the unblocking code 30.

Figure 6:
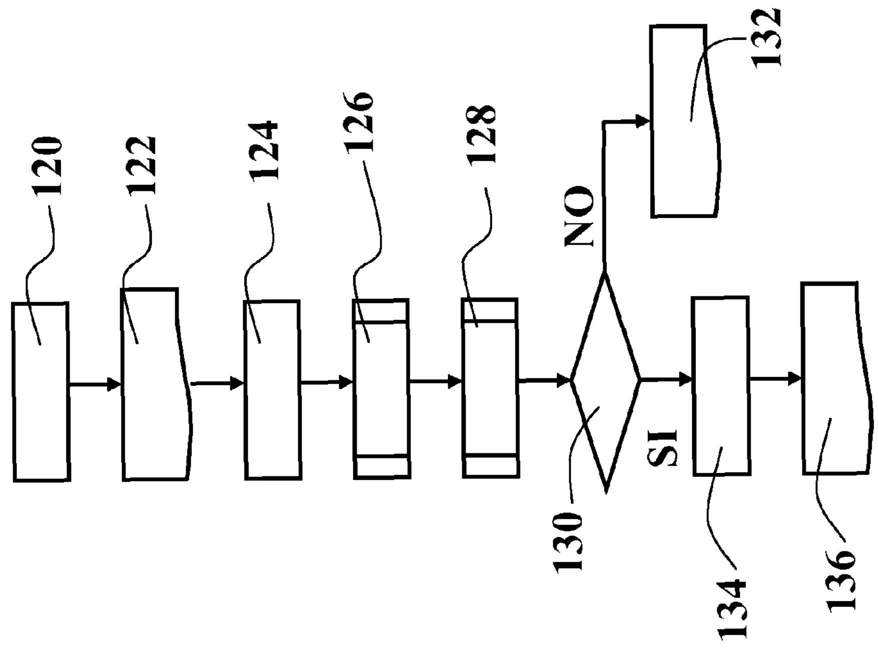
FIG. 6 is a flowchart of the steps corresponding to the requests for access to the restricted area.

With reference to FIG. 6, the flowchart of the steps regarding the request for access to the restricted area is now described.

In a step 120, the user 60 presents himself to one of the provider modules 70 and, in step 122, the user 60 communicates to the provider module 70 the right-to-access identifier, the transaction identifier, and the unblocking code 30.

Next, in step 124, the provider module 70 retrieves from the local memory or from the central file 92 the data of the specific matrix of the symbols 10.

In the next step 126, the provider module 70 pairs the unblocking code 30 to the random code 40 and obtains the reconstructed right to access. In addition, in a step 128, the provider module 70 checks whether the cells of the right to access 20 thus recomposed correspond as regards their contents to the cells of the matrix of the symbols 10. In step 130, a check is made to verify whether there is correspondence between the cells: if not, in a step 132, the provider module 70 refuses access; if there is correspondence, in a step 134 the provider module authorizes access for the user and transmits to the manager 50 (step 136) the following information:

right-to-access identifier;
transaction identifier;
access code 20; and
notification of access.

Figure 7:
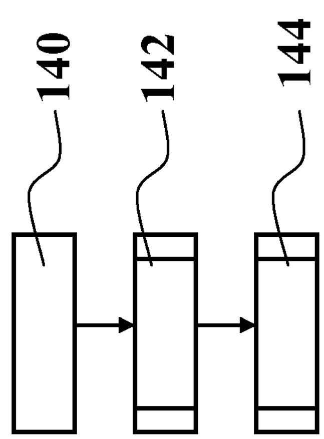
FIG. 7 is a flowchart of the steps regarding a procedure of closing of a transaction.

With reference to FIG. 7, the procedure of closing of the transaction by the manager 50 is now described.

In a step 140 the manager 50 receives from the provider module 70 the access data (the ones sent in step 136), and the manager 50 checks that the right to access transmitted by the provider module 70 corresponds (respecting the pre-set minimum threshold) to the original right to access 20; in a step 142, the manager 50 registers the access. Finally, in the next step 144, the manager 50 performs the other possible actions (payments, accrediting, statistical monitoring).

The control system according to the present invention can be used also for managing accesses to logic or virtual areas, for example, access via identifier (username) and access key (password) in a website for distribution of multimedia contents, documents, authorizations, or certifications.

Of course, the details of implementation and the embodiments may vary widely with respect to what has been described and illustrated herein, without thereby departing from the sphere of protection of the present invention, as defined by the annexed claims.

The invention claimed is:

1. A control system for managing access of users to a plurality of restricted areas via the use of rights to access, including:

at least one manager module, comprising a central processing unit, configured for issuing and checking a right to access associated to a transaction; and one or more provider modules, comprising each a local processing unit, in which each provider module is set at entrance to a restricted area and is configured for carrying out a check on the right to access, wherein:

said manager module is configured for executing a step of enabling of the right to access associated to the transaction by transmitting information on said transaction to the local processing units;

a provider module is configured for verifying the validity of the right to access presented by the user and authorizing, on the basis of the result of said verification, access to the corresponding restricted area, sending a specific notification of the provider module to the manager module at an instant in time that can be selected for notifying that access has been granted; and said manager module is moreover configured for executing, after reception of said specific notification of the provider module, a step of control of data of the transaction and a subsequent step of closing of the transaction to obtain a unique recognition of the individual access to the individual restricted area, and wherein:

said central processing unit of the manager module being also configured for:

generating a matrix of the symbols used for creation of the right to access;

generating a pair of access keys, starting from the right to access dividing the information contained in the right to access;

assigning a first key to the user; and transmitting, during the aforesaid enabling step, the matrix of the symbols and a second key to the provider modules, and said local processing unit of the provider module being also configured for:

reconstructing the right to access via the first key supplied by the user and the second key at its disposal;

comparing the information of the reconstructed right to access with the matrix of the symbols;

verifying in an autonomous way, meaning even in the absence of on-line connection with the manager, the authenticity of the reconstructed right to access;

if the comparison has yielded a positive result, authorizing access of the user; and notifying the central processing unit of the access of the user to the corresponding restricted area.

2. The control system for managing access to restricted areas according to claim 1, wherein said manager module is configured for issuing rights to access with a variable validity in time.

3. The control system for managing access to restricted areas according to claim 1, wherein said manager module comprises storage means for storing files contained in which is information regarding:

users;
provider modules;
rights to access; and
transactions.

4. The control system for managing access to restricted areas according to claim 1, wherein the aforesaid central processing unit is moreover configured for:

receiving from the provider module the specific notification of the access and the corresponding reconstructed right to access;

ascertaining, in the control step, the authenticity of the reconstructed right to access, by comparing it with the original right to access; and in the case of positive result, executing the aforesaid closing step that envisages accounting of the access, assigning to the provider module the amount due associated to the transaction.

5. The control system for managing access to restricted areas according to claim 1, wherein said manager module is configured for supplying to each user a device on which it has previously stored:

a user identifier;
a transaction identifier; and
the first key.

6. The control system for managing access to restricted areas according to claim 5, wherein each provider module comprises a reader for checking the validity of the information supplied by the device of the user.

7. The control system for managing access to restricted areas according to claim 6, wherein said manager module is configured for generating the right to access choosing arbitrarily a certain number of cells starting from the matrix of the symbols associated to the aforesaid transaction.

8. The control system for managing access to restricted areas according to claim 7, wherein said manager module is configured for generating the right to access using three fields that contain, respectively, co-ordinates of the column, co-ordinates of the row, and contents of the cells selected starting from the aforesaid matrix of the symbols.

9. The control system for managing access to restricted areas according to claim 8, wherein said manager module is configured for generating the first key by selecting the first two fields of the right to access and the second key by selecting the third field of the right to access.

10. The control system for managing access to restricted areas according to claim 9, wherein the level of inviolability defined by the manager module depends upon:

the size of the matrix of the symbols; and the complexity or size of the set of keys.

11. The control system for managing access to restricted areas according to claim 10, wherein, in order to create a mutual protection between the user and the provider module, said manager module creates a balanced level of difficulty in the possibility of violation of the system by setting a minimum threshold on the number of cells that in the reconstructed right to access must find correspondence with those of the original right to access in order for the reconstructed right to access to be deemed valid.

12. The control system for managing access to restricted areas according to claim 1, wherein the matrix of the symbols has the following characteristics:

it is an N-order square matrix;

the contents of each cell is a character, a number, or a symbol;

the rows and columns are indicized with a pre-set order of the characters, numbers, or symbols adopted;

each of the characters, numbers, or symbols adopted for the index of the columns and/or of the rows is randomly assigned to a number N of cells spread about in the matrix of the symbols.

13. A control method for managing access of users (60) to a plurality of restricted areas, wherein it comprises the operations implemented by the system according to claim 1.

* * * * *